(12) United States Patent
Farmer et al.

(10) Patent No.: US 6,239,183 B1
(45) Date of Patent: May 29, 2001

(54) METHOD FOR CONTROLLING THE RHEOLOGY OF AN AQUEOUS FLUID AND GELLING AGENT THEREFOR

(75) Inventors: Robert F. Farmer, Waccabuc; Andress K. Doyle, Pleasantville, both of NY (US); Glenda Del Carmen Vale, Bethel, CT (US); James F. Gadberry, Danbury, CT (US); Michael D. Hoey, Maplewood, NJ (US); Randy E. Dobson, Spring, TX (US)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 08/995,275

(22) Filed: Dec. 19, 1997

(51) Int. Cl.$^7$ .......................... B01J 13/00; C07C 211/64; E21B 43/16; E21B 43/22
(52) U.S. Cl. .......................... 516/102; 166/270; 166/308; 252/77; 507/129; 507/130; 507/132; 507/240; 507/245; 507/922; 510/433; 510/504; 554/55; 564/301; 564/511
(58) Field of Search .................................. 507/129, 130, 507/245, 922, 240, 132; 516/102; 524/921; 252/77; 564/511, 301, 204, 215; 554/55; 510/433; 166/270, 308

(56) References Cited

U.S. PATENT DOCUMENTS

| | | | |
|---|---|---|---|
| 2,748,139 | * | 5/1956 | Scudi et al. ...................... 564/511 X |
| 3,306,858 | * | 2/1967 | Oberle . |
| 3,849,348 | * | 11/1974 | Hewitt ............................ 510/433 X |
| 4,077,990 | * | 3/1978 | Prodo et al. ........................... 554/55 |
| 4,654,158 | * | 3/1987 | Shepherd, Jr. ................... 516/102 X |
| 4,735,731 | * | 4/1988 | Rose et al. ........................ 507/129 X |
| 4,737,296 | | 4/1988 | Watkins .............................. 507/202 |
| 4,745,976 | | 5/1988 | Harwell et al. ..................... 166/273 |
| 4,806,256 | | 2/1989 | Rose et al. ............................ 252/71 |
| 5,101,903 | | 4/1992 | Llave et al. ......................... 166/294 |
| 5,149,463 | * | 9/1992 | Peterson .......................... 516/102 X |
| 5,246,698 | * | 9/1993 | Leshchiner et al. ............. 516/102 X |
| 5,462,689 | * | 10/1995 | Choy et al. ...................... 510/433 X |

FOREIGN PATENT DOCUMENTS

| | | |
|---|---|---|
| 0070076 | 1/1983 | (EP) . |
| 0 474 284 A1 | 3/1992 | (EP) . |
| 1212782 | 11/1970 | (GB) . |
| 1404335 | 8/1975 | (GB) . |
| 2018863 | 10/1979 | (GB) . |
| 2119358 | 11/1983 | (GB) . |
| 5093181 | 4/1993 | (JP) . |
| 9003491 | 1/1997 | (JP) . |
| 10197306 | 7/1998 | (JP) . |
| WO 94/17154 * | 8/1994 | (WO) .................................. 507/130 |
| WO 9733960 | 9/1997 | (WO) . |

* cited by examiner

Primary Examiner—Richard D. Lovering
(74) Attorney, Agent, or Firm—Dilworth & Barrese, LLP

(57) ABSTRACT

A method for controlling the rheology of aqueous systems, particularly for those intended for underground use, includes injecting an aqueous fluid containing a surfactant gelling agent into the system. The surfactant gelling agents are, for example, fatty aliphatic amidoamine oxides, salts of an alkoxylated monoamine with an aromatic dicarboxylic acid, and salts of an alkyldiamine with an aromatic dicarboxylic acid. The surfactant gelling agents can be adsorbed onto particulate supports to facilitate delivery of the gelling agent. The additives may be incorporated in the viscoelastic fluid to tailor its use in hydraulic fluids, drilling muds, fracture fluids, and in applications such as permeability modification, gravel packing, cementing, and the like.

35 Claims, No Drawings

METHOD FOR CONTROLLING THE RHEOLOGY OF AN AQUEOUS FLUID AND GELLING AGENT THEREFOR

BACKGROUND OF THE INVENTION

1. Field of the Invention

The present invention relates to methods and agents for modifying aqueous fluids and, in particular, to modifying the rheological behavior of aqueous fluids used in well drilling and similar subterranean operations.

2. Background of the Art

Fluids are used in well drilling operations, for example, to cool and lubricate the drilling bit, to carry away drilled solids and other debris, to suspend drilled cuttings and other debris when the fluid column is static, to control subsurface pressure, to prevent squeezing or caving of formations, to suspend propping agents, and to minimize damage to any potential production zone. In hydraulic operations fluids are used to transfer pressure from one location to another.

Drilling fluids and hydraulic fluids can be water based or oil based. Typically, water based drilling and hydraulic fluids can include one or more aqueous fluid thickening agents, lubricants, and corrosion inhibitors. The aqueous fluid can be fresh water or brine, and can include aqueous solutions of acids, alkali, lower alkanols (methanol, ethanol, and propanol), glycols, and the like, provided that the water miscible liquid does not adversely affect the viscoelastic properties of the aqueous fluid. Also included are emulsions of immiscible liquids in water and aqueous slurries of solid particulates such as clay.

Viscoelasticity is a desirable rheological feature in drilling and hydraulic fluids which can be provided by fluid modifying agents such as polymeric agents and surfactant gelling agents. Viscoelastic fluids are those in which the application of stress gives rise to a strain that approaches its equilibrium value relatively slowly. Viscoelasticity manifests itself in shear rate thinning behavior. For example, when such a fluid is passed through a pump or is in the vicinity of a rotating drill bit, the fluid exhibits low viscosity. When the shearing force is abated the fluid returns to its more viscous condition.

Another function of fluid modifying agents in oil drilling applications is permeability modification. Secondary recovery of oil from reservoirs involves supplementing by artificial means the natural energy inherent in the reservoir to recover the oil. For example when the oil is stored in porous rock it is often recovered by driving pressurized fluid, such as brine, through one or more drill holes to force the oil to a well bore from which it can be recovered. However, rock often has areas of high and low permeability. The brine will finger its way through the high permeability areas leaving oil in the low permeability areas.

Various methods have been employed to solve this problem. For example, U.S. Pat. No. 5,101,903 discloses a method for reducing the permeability of the more permeable zone of an underground formation having nonuniform permeability. The method comprises injecting into the formation a blend of surfactant and an alcohol, the blend being introduced in an amount effective to reduce the permeability of the more permeable zone of the formation. The preferred surfactant is an amine oxide such as dimethyltallowamine oxide delivered in water. A disclosed alcohol is isopropanol. The method may include the further step of injecting an alcohol slug following injection of the surfactant and alcohol blend.

U.S. Pat. No. 4,745,976 discloses a method for partially or completely blocking the high permeability regions of a reservoir. The technique is based upon the ability to induce phase changes in surfactant solutions by changing counterions or by adding small quantities of different surfactants. An aqueous solution of an ionic surfactant may have a viscosity only slightly different from brine but an increase in the salt concentration or addition of a multivalent counterion can cause the surfactant to form a solid precipitate or form a gel-like structure of high viscosity. In the method of U.S. Pat. No. 4,745,976, a first surfactant solution is injected into the formation followed by a water-soluble spacer fluid followed by a second surfactant solution. In situ mixing of the two surfactant solutions is affected by the tendency of different surfactant types to travel at different velocities through the reservoir. The compositions of the first and second surfactants solutions are chosen so that upon mixing, a precipitated or gel-like structure will form blocking the high permeability zone of the reservoir.

SUMMARY OF THE INVENTION

In accordance with this invention, the rheology of an aqueous fluid is modified by the method which comprises adding to an aqueous fluid an amount of gelling agent sufficient to form a viscoelastic fluid, the gelling agent being selected from the group consisting of:

i) an amidoamine oxide of the general formula

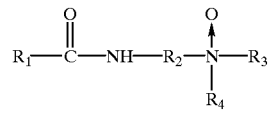

wherein $R_1$ is a saturated or unsaturated, straight or branched chain aliphatic group of from about 7 to about 30 carbon atoms, and ii) an ammonium salt obtained from the reaction of a monoamine or diamine possessing at least one secondary or tertiary amine group with the amine nitrogen directly bonded to a saturated or unsaturated, straight or branched chain aliphatic group of from about 12 to about 30 carbon atoms and an aromatic dicarboxylic acid.

The gelling agents employed in the foregoing method advantageously provide clear gels which do not undergo phase separation over extended periods of time and exhibit high heat stability.

DESCRIPTION OF THE PREFERRED EMBODIMENTS

A viscoelastic fluid especially useful in underground applications can be obtained by adding one or more gelling agent such as described below, optionally with an alcohol, to an aqueous fluid. The concentration of gelling agent in the aqueous fluid can generally range from about 0.5% to about 10% by weight, preferably from about 2% to about 8% by weight, and more preferably from about 4% to about 6% by weight. The aqueous fluid can include inorganic salts and various additives as described hereinbelow. Such a solution is advantageously injected into, for example, an underground system for use in drilling, hydraulic fracturing, for permeability modification of underground formations, and for uses such as gravel packing, and cementing.

The gelling agents disclosed and described herein are surfactants which can be added singly or in combination to the aqueous fluid. Optionally, the gelling agents can be absorbed onto the surface of non-reactive dispersible solids to be used in the form of a flowable powder which, when added to water or aqueous brine, imparts desired viscosity or rheological characteristics. Such non-reactive dispersible solids can include, for example, silica, silicates, alumina, aluminates, silicoaluminates, salts of alkali or alkaline earth metals, carbon black, borax, cellulose, hydroxycellulose, hydroxyethyl cellulose, and the like. The particle size of the solid can range from relatively large particles such as silica sand, to finely ground powder depending on the particular application for the fluid modifying agent. As those skilled in the art will appreciate, particle size is essentially irrelevant where the particles of the solid are soluble.

In one embodiment the gelling agent is an amidoamine oxide having the structure

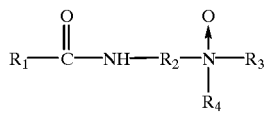

(I)

wherein $R_1$ is a saturated or unsaturated, straight or branched chain aliphatic group of from about 7 to about 30 carbon atoms, preferably from about 17 to about 21 carbon atoms. More preferably, $R_1$ is a fatty aliphatic derived from tallow having an iodine value of from about 40 to about 65. $R_1$ may be restricted to a single chain length or may be of mixed chain length such as those groups derived from natural fats and oils or petroleum stocks. Preferred are tallow alkyl, hardened tallow alkyl, rapeseed alkyl, hardened rapeseed alkyl, coco alkyl, oleyl, or soya alkyl. $R_2$ is a divalent alkylene group of from 2 to about 6 carbon atoms, preferably, of 2 to 4 carbon atoms and more preferably of 3 carbon atoms. $R_3$ and $R_4$ are the same or different and are selected from alkyl or hydroxyalkyl groups of from 1 to about 4 carbon atoms and are preferably hydroxyethyl or methyl. Particularly useful amidoamine oxides include oleyl amidopropyldimethylamine oxide, tallow alkyl amidopropyldimethylamine oxide, and soya alkyl amidopropyldimethylamine oxide, optionally blended with glycerine. Alternatively, $R_3$ and $R_4$ in the amidoamine oxide of formula I together with the nitrogen atom to which these groups are bonded form a heterocyclic ring of up to 6 members. Illustrative of these amidoamine oxides are those derived from:

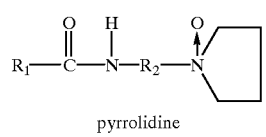

(II)

pyrrolidine

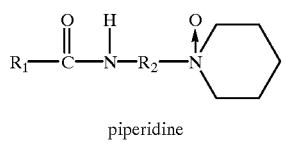

(III)

piperidine

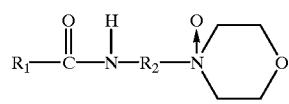

(IV)

morpholine

The amidoamine oxides of formula I are preferably supported on a particulate such as silica, silicates, aluminum, aluminates, silicoaluminicates, salts of alkali or alkaline earth metals such as sodium or potassium chloride, sodium or potassium sulfate, calcium or magnesium chloride, or magnesium sulfate, carbon black, borax, cellulose, hydroxycellulose and hydroxyethyl cellulose. However, sodium carbonate, potassium carbonate, and calcium carbonate are advantageously also suitable as particulate supports for the amidoamine oxide gelling agents.

In yet another embodiment of the invention, the surfactant gelling agent used therein is an ammonium salt obtained from the reaction of a monoamine or diamine possessing at least one secondary or tertiary amine group with the amine nitrogen directly bonded to a saturated or unsaturated, straight or branched chain aliphatic group of from about 12 to about 30 carbon atoms and an aromatic dicarboxylic acid.

In one preferred embodiment, the gelling agent can be an ammonium salt derived from an alkoxylated monoamine and an aromatic dicarboxylic acid, the gelling agent having the general formula

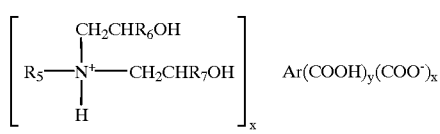

(V)

wherein $R_5$ is a saturated or unsaturated, straight or branched chain aliphatic group of from about 10 to about 30 carbon atoms and preferably, from about 18 to about 22 carbon atoms. $R_5$ may be restricted to a single chain length or may be of mixed chain lengths such as those groups derived from natural oils and fats or petroleum stocks. Especially preferred are tallow alkyl, coco alkyl, stearyl, oleyl, and soya alkyl. $R_6$ and $R_7$ are the same or different and are hydrogen, methyl or ethyl and preferably hydrogen. Ar is an aromatic group and x is 1 or 2, y is 0 or 1 and the sum of x and y is 2. The parent aromatic dicarboxylic acid $Ar(COOH)_2$ preferably has the carboxylic acid groups on adjacent carbons of aromatic ring Ar. Moreover, aromatic ring Ar can contain further substituents ring such as, but not limited to, halides (—F,—Cl, —Br, —I), nitro (—NO$_2$), hydroxy (—OH) and alkyl groups. The most preferred aromatic dicarboxylic acid is phthalic acid.

A gelling agent in accordance with the present invention can be prepared from ethoxylated fatty alkyl monoamines commercially available from Akzo Nobel Chemicals, Inc. of Chicago, Ill., under the designation Ethomeen®. Suitable Ethomeen materials include Ethomeen O/12 wherein $R_5$ is oleyl, Ethomeen S/12 wherein $R_5$ is a mixture of saturated and unsaturated aliphatic groups derived from soybean oil, Ethomeen T/12 wherein $R_5$ is a mixture of saturated and unsaturated aliphatic groups derived from tallow, and Ethomeen 18/12 wherein $R_5$ is stearyl. $R_6$ and $R_7$ in the Ethomeen materials are each hydrogen.

The aromatic dicarboxylic acid salt used as the gelling agent can be prepared by merely blending the alkoxylated fatty alkyl amine with a desired acid in aqueous solution, typically at a temperature between ambient and about 100° C., preferably from about 25° C. to about 70° C. The amount of water present in the aqueous solution may be varied according to the desired viscosity of the salt solution obtained. The molar ratio of amine to acid is preferably in the range of 1:09 to 1:1.1.

The aromatic dicarboxylic acid salts of the alkoxylated fatty alkyl monoamine as described herein can be used as gelling agents, for example, to impart viscoelastic properties, to modify the permeability of underground formations, as additives to brines and hydraulic fracture fluids, and other such applications. The concentration of gelling agent preferably ranges from about 1% to about 10% depending on the desired viscosity, more preferably about 3% to 8%, and most preferably about 4% to about 6%. Moreover the gelling agent may be applied to the fluid in the form of a freely flowable powder in which the gelling agent is carried by a particulate support such as sand, borax, alumina and the like.

The gelling agent can also be the quaternary ammonium salt derived from an alkyl diamine and an aromatic dicarboxylic acid, the gelling agent having the formula

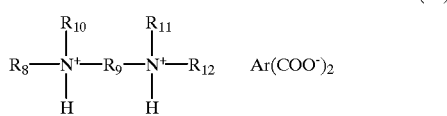

(VI)

wherein $R_8$ is a saturated or unsaturated, straight or branched chain aliphatic group of from about 12 to about 30 carbon atoms and preferably from about 18 to about 22 carbon atoms. $R_8$ may be restricted to a single chain length or may be of mixed chain lengths such as those groups derived from natural oils and fats or petroleum stocks. Especially preferred are tallow alkyl, coco alkyl, stearyl, oleyl, soya alkyl. $R_9$ is a divalent alkylene group of up to about 6 carbon atoms, preferably of 2 to 4 carbon atoms, and more preferably of 3 carbon atoms. $R_{10}$, $R_{11}$ and $R_{12}$ can be the same or different and are selected from the group consisting of hydrogen, $C_1$–$C_4$ alkyl, 2-hydroxyethyl and 2-hydroxypropyl. Preferably, $R_{10}$, $R_{11}$, and $R_{12}$ are each hydrogen. Ar is an aromatic group and preferably contains the carboxylic acid groups attached to alternate carbons of the aromatic ring. Moreover, the aromatic ring Ar can contain further substituents on the ring such as halides (—F,—Cl, —Br, —I), nitro (—$NO_2$), hydroxy (—OH) and alkyl groups. The preferred aromatic dicarboxylic acid is isophthalic acid.

Alkyl diamines suitable for preparation of this gelling agent are available from Akzo Nobel Chemicals, Inc. of Chicago, Ill. under the designation Duomeen®. The molar ratio of alkyl diamine to aromatic dicarboxylic acid in the composition ranges from about 0.9 to about 1.1 mole of diamine per mole of acid, preferably about 0.95 to about 1.05 mole of diamine per mole of acid, and most preferably about 1 mole of diamine per mole of acid.

The compound of formula VI can be made by reacting a diamine having the formula $R_8NHR_9NH_2$ with a desired aromatic dicarboxylic acid (for example, phthalic acid, and more preferably isophthalic acid) in aqueous solution for about 0.5 to about 2 hours at a temperature between ambient and about 100° C., preferably about 25° C. to about 70° C.

In a particularly useful embodiment, a diamine of the formula $R_{13}NH$—$R_9$—$NH_2$ wherein $R_{13}$ is a saturated or unsaturated, straight or branched chain aliphatic group having about 18 carbon atoms and $R_9$ is as previously defined is reacted in an aqueous solution with an aromatic dicarboxylic acid, preferably phthalic acid, at temperatures of at least about 40° C. Upon cooling, a slurry is formed which can be dried to a powder by removing water. Unexpectedly, upon addition of water to the powder prepared in accordance with this embodiment, a slurry having the desired gelling properties is re-formed. This embodiment advantageously permits shipping of the gelling agents as a dry powder, avoiding the high costs associated with shipping a product containing large quantities of water.

Particularly suitable gelling agents include tallow alkylamino propylamine isophthalate, hardened tallow alkylamino propylamine isophthalate, hardened rapeseed alkylamino propylamine isophthalate, oleylamino propylamine isophthalate, and cocoalkylamino propylamine isophthalate. The viscoelastic aqueous solution of the surfactant gelling agents described above can also contain inorganic salts (e.g., brines which contain alkali metal salts, alkaline earth metal salts, and/or ammonium salts), and other viscosity modifying additives (e.g., such as cellulosics). Also, the aqueous solution can contain alcohols (e.g. isopropanol, methanol, ethanol), hydrocarbons (e.g. branched or straight chain alkanes of from about 7 to about 10 carbon atoms), organic solvents, hydrotopes, and various polymers. Brines gelled with such agents are advantageously used as water diversion agents, pusher fluids, fracture fluids, drilling muds, workover fluids and completion fluids.

When used in hydraulic applications, the viscoelastic fluid can optionally include lubricants, corrosion inhibitors and various other additives.

Lubricants can include metal or amine salts of an organo sulfur, phosphorus, boron or carboxylic acid. Typical of such salts are carboxylic acids of 1 to 22 carbon atoms including both aromatic and aliphatic acids; sulfur acids such as alkyl and aromatic sulfonic acids and the like; phosphorus acids such as phosphoric acid, phosphorous acid, phosphinic acid, acid phosphate esters, and analogous sulfur homologs such as the thiophosphoric and dithiophosphoric acid and related acid esters; mercaptobenzothiozole; boron acids including boric acid, acid borates and the like; and lauric acid amine salts.

Corrosion inhibitors can include alkali metal nitrites, nitrates, phosphates, silicates and benzoates. Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized aromatic carboxylic acids (e.g., 4-(t-butyl)-benzoic acid), neutralized naphthenic acids and neutralized hydrocarbyl sulfonates. Mixed salt esters of alkylated succinimides are also useful. Corrosion inhibitors can also include the alkanolamines such as ethanolamine, diethanolamine, triethanolamine and the corresponding propanolamines as well as morpholine, ethylenediamine, N,N-diethylethanolamine, alpha- and gamma-picoline, piperazine and isopropylaminoethanol.

Hydraulic fluids can also include additives for specific applications to optimize the performance of the fluid. Examples include colorants; dyes; deodorants such as citronella; bactericides and other antimicrobials; chelating agents such as an ethylene diamine tetraacetate sodium salt or nitrilo triacetic acid; anti-freeze agents such as ethylene glycol and analogous polyoxyalkylene polyols; anti-foamants such as silicone-containing agents and shear stabilizing agents such as commercially available polyoxyalkylene polyols. Anti-wear agents, friction modifiers, anti-slip and lubricity agents may also be added. Also included are extreme pressure additives such as phosphate esters and zinc dialkyl dithiophosphate.

The surfactants disclosed and described herein are advantageously used as gelling agents for fracture fluids. Such fluids create channels or fractures in oil producing zones in order to improve oil production by providing a high permeability pathway from the reservoir rock to the well bore. Typically, fracture fluids are pumped at pressures exceeding the overburden weight of the rock formation thereby causing splits and fractures in the formation rock. Propping agents (e.g. particulate matter) are added to the fluid to prevent the induced fractures from closing after fluid induction by propping open the induced splits and fractures. Gelling agents are added to the fluid to support such propping agents.

The gelling agents disclosed herein provide several advantages over the polymers (e.g., polysaccharides) currently used as gelling agents for fracture fluids.

For example, the compounds set forth herein (particularly the alkyl amidoamine oxide, and more particularly, alkyl amidopropylamine oxide) when used as gelling agents for fracture fluid produce less residue which could result in formation damage during and after the fracturing process.

Also, it is easier to produce the gelled fluid as compared with polymers which typically must be hydrated, and the gelled fluid can be designed to "break" with formation temperatures or other factors such as oxidizers or acids. The gelling agents set forth below are useable over a wide range of temperature depending on chain length, and can assist in cleaning oil from the formation.

A suitable fracture fluid can include fresh water or a brine containing sodium chloride (typically 1–5% by weight) and/or calcium chloride (typically 0.5–3% by weight), to which optionally about 3% to about 10%, and preferably about 4% to about 6%, of gelling agent has been added.

For purposes of selectively modifying the permeability of underground rock formations one or more gelling agent can first be blended with water, preferably including an alcohol, to form a viscoelastic fluid which is then injected into the rock formation in an amount effective to reduce the permeability of the more permeable zone(s) of the formation. Optionally, the concentration of gelling agent in the fluid can be from about 0.5% to about 10%, preferably from about 2% to about 8%, and more preferably from about 4% to about 6% by weight. Optionally, the initial injection of viscoelastic fluid can be followed by the injection of an alcohol slug to further propagate said gelling agent solution into the rock formation. Preferred alcohols are methanol, ethanol, n-propanol, isopropanol, isoamyl alcohol, n-butanol, sec. butanol, and tert. butanol. Most preferred is isopropanol.

The following examples are illustrative of the method of modifying the rheological behavior of aqueous fluids in accordance with the present invention.

Examples 1–4 relate to the preparation of N-alkyl-N,N-di(2-hydroxyethyl)amine phthalate salts. In each case, the ethoxylated amine is mixed with an equimolar amount of phthalic acid and water then heated to 70° C. with minimal agitation (due to viscosity of mixture). When the material was completely mixed a clear isotropic gel is formed. These solutions can be made in water in concentrations between 2–50% amine salt in water. The solutions were judged to be viscoelastic if the clear gel exhibits rebound when torque applied to the sample is ceased.

EXAMPLE 1

61.7g of bis(2-hydroxyethyl)tallow alkylamine was mixed with 29.8 of phthalic acid and 823.5 g of water to make a 10% solution. This was heated to 70° C. to make a clear gel which exhibited rebound.

EXAMPLE 2

65.0 g of bis(2-hydroxyethyl)hydrogenated rapeseed alkylamine was mixed with 26.5 g of phthalic acid and 823.5 g of water to make a 10% solution. This was heated to 70° C. to make a clear gel which exhibited rebound.

EXAMPLE 3

61.5 g of bis(2-hydroxyethyl)octadecyl amine was mixed with 30.0 g phthalic acid and 823.5 g of water to make a 10% solution. This was heated to 70° C. to make a clear gel which exhibited rebound.

EXAMPLE 4

3.4 g of bis(2-hydroxyethyl)soyaalkyl amine was mixed with 1.6 g of phthalic acid and 95 g of water to make a 5% solution. This was heated to 70° C. to make a clear gel which exhibited rebound.

EXAMPLE 5

Preparation of Silica-Supported N-tallow Alkyl-1,3-diminopropane Isophthalate (30% active)

Precipitated silica powder (Degussa silical 500LS), 30 grams, and 70 grams of 50% aqueous N-tallow alkyl-1,3-diamninopropane isophthalate 1:1salt were charged to a blender. Blending was commenced and continued until the mixture became a flowable solid. Approximately 100 grams of a 35% active flowable powder was obtained. When this powder was added to water at a level sufficient to give 2% (w/w water) amine salt, a viscoelastic gel with characteristics similar to those observed for the diamine salt without silica support was obtained.

EXAMPLE 6

Preparation of N,N' Dimethylaminopropyl Tallowamide 611.7 grams (2.207 moles) of tallow fatty acid and 236.86 grams (2.318 moles) of DMAPA were loaded into a reactor. The reactor was purged with 50 psig of nitrogen 3 times. The temperature of the mixture was raised to 175° C. and the reaction proceeded for 4 hours. Pressure was released slowly over a 1 hour period. The temperature was increased to 205° C. and the reaction continued for 2 more hours. Again, the pressure generated was slowly vented. With the aid of a nitrogen sparge the reaction is completed to residual fatty acid content of <2%.

EXAMPLE 7

359.2 grams of tallow fatty acid and 139 grams of DMAPA are loaded in a reactor. The mixture was heated to 55–62° C. and purged 3 times with 50 psig of nitrogen. The reactor was heated to 175° C. and kept at the temperature for 4 hours. The developed pressure was vented slowly over a period of 1 hour. The reactor was then heated to 205 ° C. and kept for two hours at that temperature. The pressure generated by water was vented off slowly again. The reactor was cooled down to 80° C. while sparging with nitrogen and product was then unloaded.

EXAMPLE 8

Preparation of Tallow Amidopropyldimethylamine Oxide, 30% Active in Water 858.6 grams of deionized water, 0.31 gram of EDTA, and 400.1 grams of tallowamidopropyldimethylamine were charged into a glass reactor and heated while agitated to 65° C. 139.7 grams of 30% hydrogen peroxide were then added dropwise to the reaction mixture over 1 hour period, while keeping the temperature at or under 75° C. After addition was completed, the reaction mixture was digested for 4 hours at 65–80° C. Sample was taken to determine free amine, hydrogen peroxide, and amine oxide content.

The finished Tallowamidopropyldimethylamine oxide, (30% active in water) was added with stirring to a 10% TDS brine solution at a 6% level. A gel formed after mixing vigorously.

EXAMPLE 9

Preparation of Tallowamidopropyldimethylamine Oxide, 30% Active in Water 873.1 grams of water, 0.33 grams of EDTA, and 409 grams of tallowamidopropyldimethylamine were charged into a glass reactor and heated under light nitrogen sparge, and continuous agitation to 58° C. 124.8 grams of 30% hydrogen peroxide were added over one hour and a half period. The reaction mixture was digested for four hours at 69–73°. Final analysis showed 28% amine oxide, 0.53% free amine.

EXAMPLE 10

Preparation of Tallowamidopropyldimethylamine Oxide in Isopropanol 269.3 grams of Tallowamidopropyldimethylamine, 0.32 grams of EDTA and, 933 grams of isopropanol were charged into a glass reactor and heated under light nitrogen sparge and continuous agitation to 61° C. 37 grams of 70% hydrogen peroxide were then added over a period of 90 minutes. The reaction was digested at 80° C. for 33 hours. Free amine in finished product was found to be 1.5%.

EXAMPLE 11

N-tallow Alkyl-1,3-diaminopropane Isophthalate Preparation

A diamine isophthalate salt gel was prepared in situ for immediate use by adding into a container holding a specified amount of water, 7.31% (per water charge) of liquified, melted N-tallow alkyl-1,3-diaminopropane, and 3.80% (per water charge) of Isophthalic Acid and shaking the container while heating to 70° C. in a water bath. The clear viscoelastic gel was stable at room temperature.

EXAMPLE 12

Preparation and Use of N-Octadecyl-1,3-diaminopropane Isophthalate

The diamine isophthalate salt gel was prepared in situ for immediate use by adding into a container holding a specified amount of water, 7.36% (per water charge) of liquified, melted N-octadecyl-1,3-diaminopropane, and 3.75% of isophthalic acid and shaking the container while heating to 70° C. in a water bath. The transition to a clear viscoelastic gel was observed at >70° C. by inspecting the recoil of the gel. Upon cooling down at room temperature the gel became a flowable slurry with a fraction of the viscosity of the gel system that occurs at >70° C. Reheating the slurry to >40° C. restored the viscoelastic gel.

Alternatively, the aforementioned slurry can be vacuum filtered and dried to obtain a flowable powder which when added to water or brine will produce a viscoelastic gel upon heating to >40° C.

While the above description contains many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

What is claimed is:

1. A method for controlling the rheology of fluid in an aqueous system comprising:
   a) providing one or more gelling agents selected from the group consisting of
      i) an amidoamine oxide of the general formula

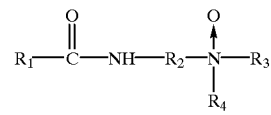

wherein $R_1$ is a saturated or unsaturated, straight or branched chain aliphatic group of from about 7 to about 30 carbon atoms, $R_2$ is a divalent alkaline group of from 2 to about 6 carbon atoms, $R_3$ and $R_4$ are the same or different and are alkyl or hydroxy alkyl of from 1 to about 4 carbon atoms, or $R_3$ and $R_4$ together with the nitrogen atom to which they are bonded form a heterocyclic ring of up to 6 members, and
      ii) a quaternary ammonium salt obtained from the reaction of a monoamine or diamine possessing at least one secondary or tertiary amine group with the amine nitrogen directly bonded to a saturated or unsaturated, straight or branched chain aliphatic group of from about 12 to about 30 carbon atoms and an aromatic dicarboxylic acid;
   b) adding said gelling agent to an aqueous fluid in an amount sufficient to form a viscoelastic fluid; and
   c) injecting said viscoelastic fluid into an underground formation.

2. The method of claim 1 wherein the gelling agent is the amidoamine oxide.

3. The method of claim 2 wherein $R_1$ is an aliphatic group of from about 17 to about 21 carbon atoms, and $R_2$ is an alkylene group of from about 2 to about 4 carbon atoms.

4. The method of claim 2 wherein $R_1$ is an aliphatic group derived from tallow having an iodine value of from about 40 to about 65, and $R_2$ is an alkylene group having 3 carbon atoms.

5. The method of claim 2 wherein $R_1$ is selected from the group consisting of tallow alkyl, hardened tallow alkyl, rapeseed alkyl, hardened rapeseed alkyl, coco alkyl, oleyl and soya alkyl, $R_2$ is an alkylene group having three carbon atoms, and $R_3$ and $R_4$ are each methyl.

6. The method of claim 2 wherein $R_3$ and $R_4$ together with the amine nitrogen to which they are bonded form a heterocyclic group having a 5-member ring derived from pyrrolidine.

7. The method of claim 2 wherein $R_3$ and $R_4$ together with the amine nitrogen to which they are bonded form a heterocyclic group having a 6-member ring derived from piperidine.

8. The method of claim 2 wherein $R_3$ and $R_4$ together with the amine nitrogen to which they are bonded form a heterocyclic group having a 6-member ring derived from morpholine.

9. The method of claim 1 wherein the gelling agent is a salt of an alkoxylated monoamine with an aromatic dicarboxylic acid having the following general formula

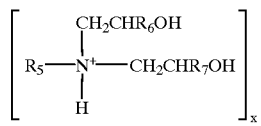

wherein $R_5$ is a saturated or unsaturated, straight or branched chain aliphatic group of from about 12 to about 30 carbon atoms, $R_6$ and $R_7$ are the same or different and are hydrogen, methyl or ethyl, Ar is an aromatic group, x is 1 or 2, y is 0 or 1, and the sum of x and y is 2.

10. The method of claim 9 wherein $R_5$ is an aliphatic group of from about 18 to about 22 carbon atoms.

11. The method of claim 9 wherein $R_5$ is selected from the group consisting of tallow alkyl, coco alkyl, stearyl, oleyl, and soya alkyl, $R_6$ and $R_7$ are each methyl, and the dicarboxylic acid is phthalic acid.

12. The method of claim 9 wherein the aromatic group Ar includes at least one ring substituent selected from the group consisting of F, Cl, Br, I, $NO_2$, alkyl and OH.

13. The method of claim 1 wherein the gelling agent is the salt of an alkyl diamine with an aromatic dicarboxylic acid having the formula

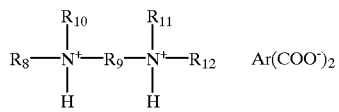

wherein $R_8$ is a saturated or unsaturated, straight or branched chain aliphatic group of from about 12 to about 30 carbon atoms, $R_9$ is a divalent alkylene group of from about 2 to about 6 carbon atoms, and Ar is an aromatic group, and $R_{10}$, $R_{11}$ and $R_{12}$ are the same or different and are individually selected from the group consisting of hydrogen, $C_1$–$C_4$ alkyl 2-hydroxyethyl and 2-hydroxypropyl.

14. The method of claim 13 wherein $R_8$ is an aliphatic group of from about 18 to about 22 carbon atoms, and $R_9$ is an alkylene group of from about 2 to about 4 carbon atoms.

15. The method of claim 13 wherein $R_8$ is selected from the group consisting of tallow alkyl, hardened tallow alkyl, hardened rapeseed alkyl, oleyl and cocoalkyl, $R_9$ is an alkylene group of 3 carbon atoms, and the aromatic dicarboxylic acid is isophthalic acid.

16. The method of claim 13 wherein the aromatic group Ar includes at least one ring substituent selected from the group consisting of F, Cl, Br, I, $NO_2$, alkyl and OH.

17. The method of claim 1 wherein the gelling agent is present in the aqueous fluid at a concentration of from about 0.5% to about 10% by weight.

18. The method of claim 1 wherein the gelling agent is present in the aqueous fluid at a concentration of from about 2% to about 8% by weight.

19. The method of claim 1 wherein the gelling agent is present in the aqueous fluid at a concentration of from about 4% to about 6% by weight.

20. The method of claim 1 further including the step of absorbing the gelling agent on a dispersible particulate support prior to adding the gelling agent to the aqueous fluid.

21. The method of claim 20 wherein said particulate support is chosen from the group consisting of silica, silicates, alumina, aluminates, silicoaluminates, sodium sulfate, potassium sulfate, magnesium sulfate, sodium chloride, potassium chloride, calcium chloride, magnesium chloride, carbon black, borax, cellulose, hydroxycellulose, and hydroxyethyl cellulose.

22. The method of claim 20 wherein the gelling agent is the amidoamine oxide, and the particulate support is chosen from the group consisting of silica, silicates, alumina, aluminates, silicoaluminates, sodium chloride, potassium chloride, calcium chloride, magnesium chloride, sodium sulfate, potassium sulfate, magnesium sulfate, carbon black, borax, cellulose, hydroxycellulose, hydroxyethyl cellulose, sodium carbonate, potassium carbonate, and calcium carbonate.

23. The method of claim 1 further including the step of adding to said aqueous fluid in addition to said gelling agent, at least one additive selected from the group consisting of lubricants, corrosion inhibitors, colorants, dyes, deodorants, bacteriacides, chelating agents, antifreeze agents, anti-wear agents, extreme pressure additives, hydrotopes, and viscosity modifiers.

24. The method of claim 1 further including the step of adding to said aqueous fluid in addition to said gelling agent at least one component selected from the group consisting of alcohol, and hydrocarbon.

25. The method of claim 24 wherein said component is an alcohol selected from the group consisting of methanol, ethanol, n-propanol, isopropanol, isoamyl alcohol, n-butanol, sec. butanol, and tert. butanol.

26. The method of claim 25 wherein said alcohol is isopropanol.

27. The method of claim 1 further including the step of adding a polymeric material to said aqueous fluid.

28. A method for controlling the rheology of fluid in an aqueous system comprising:
   a) providing one or more gelling agents selected from the group consisting of amidoamine oxides of the general formula

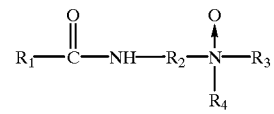

wherein $R_1$ is a saturated or unsaturated, straight or branched chain aliphatic group of from about 7 to about 30 carbon atoms, $R_2$ is a divalent alkylene group of from 2 to about 6 carbon atoms, together with the nitrogen atom to which they are bonded, $R_3$ and $R_4$ form a heterocyclic ring of up to 6 members;
   b) adding said gelling agent to an aqueous fluid in an amount sufficient to form a viscoelastic fluid; and
   c) injecting said viscoelastic fluid into the aqueous system.

29. The method of claim 28 wherein $R_3$ and $R_4$ together with the amine nitrogen to which they are bonded form a heterocyclic group having a 5-member ring derived from pyrrolidine.

30. The method of claim 28 wherein $R_3$ and $R_4$ together with the amine nitrogen to which they are bonded form a heterocyclic group having a 6-member ring derived from piperidine.

31. The method of claim 28 wherein $R_3$ and $R_4$ together with the amine nitrogen to which they are bonded form a heterocyclic group having a 6-member ring derived from morpholine.

32. A method of preparing a gelling agent comprising:

a) reacting a compound of the general formula RNHR'NH wherein R is a saturated or unsaturated, straight or branched chain aliphatic group having about 18 carbon atoms and R' is a divalent alkylene group of from about 2 to about 6 carbon atoms, with phthalic acid at a temperature of at least about 40° C. in an aqueous solution;

b) removing water from the aqueous solution to recover a powder containing an aromatic dicarboxylic acid salt.

33. A composition of matter comprising:

an aromatic dicarboxylic acid salt of the formula

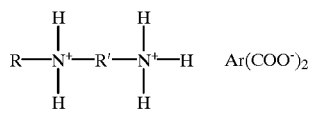

wherein R is a saturated or unsaturated straight or branched chain aliphatic group having about 18 carbon atoms and R' is a divalent alkylene group of from about 2 to about 6 carbon atoms and Ar is an aromatic group.

34. A composition as in claim 33 in the form of a powder.

35. A composition as in claim 33 wherein the aromatic dicarboxylic acid salt is prepared by reacting a compound of the formula RNHR'NH$_2$ wherein R is a saturated or unsaturated straight or branched chain aliphatic group having about 18 carbon atoms and R' is a divalent alkylene group of from about 2 to about 6 carbon atoms with phthalic acid.

* * * * *